United States Patent [19]

Lohmann et al.

[11] Patent Number: 4,590,769
[45] Date of Patent: May 27, 1986

[54] HIGH-PERFORMANCE BURNER CONSTRUCTION

[75] Inventors: Robert P. Lohmann, South Windsor; Ronald A. Jeroszko, Hebron, both of Conn.

[73] Assignee: United Technologies Corporation, Hartford, Conn.

[21] Appl. No.: 224,406

[22] Filed: Jan. 12, 1981

[51] Int. Cl.⁴ ............................................... F02C 3/00
[52] U.S. Cl. .................................................... 60/752
[58] Field of Search ................. 60/746, 759, 752, 732, 60/39.23, 748; 417/12

[56] References Cited

U.S. PATENT DOCUMENTS

| | | | |
|---|---|---|---|
| Re. 30,160 | 10/1979 | Emory, Jr. et al. ................. | 60/752 |
| 2,826,039 | 3/1958 | Ashwood ............................... | 60/752 |
| 3,099,134 | 12/1960 | Calder et al. ......................... | 60/752 |
| 3,859,786 | 1/1975 | Azelborn et al. ................... | 60/39.23 |
| 3,872,664 | 3/1975 | Lohmann et al. .................... | 60/746 |
| 4,054,028 | 9/1977 | Kawaguchi ........................... | 60/748 |
| 4,265,085 | 5/1981 | Fox et al. ............................. | 60/742 |
| 4,265,615 | 5/1981 | Lohmann .............................. | 60/748 |

Primary Examiner—Carlton R. Croyle
Assistant Examiner—Timothy S. Thorpe
Attorney, Agent, or Firm—Charles A. Warren

[57] ABSTRACT

A burner construction for gas turbine engines in which the conventional throat is replaced by a plurality of tubes extending radially into the burner downstream of the end cap, the inner ends being spaced apart to provide a clear axial passage and the tubes being spaced apart circumferentially to leave axial passages therebetween.

2 Claims, 6 Drawing Figures

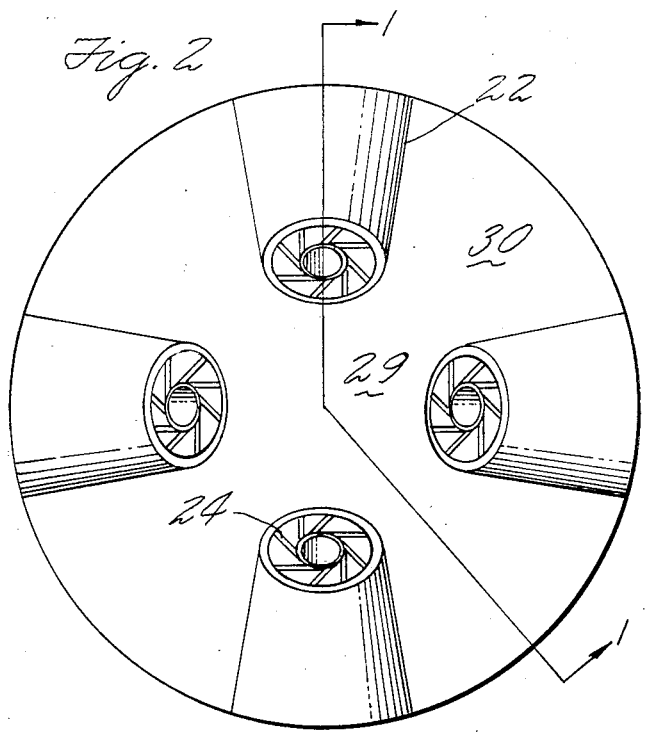
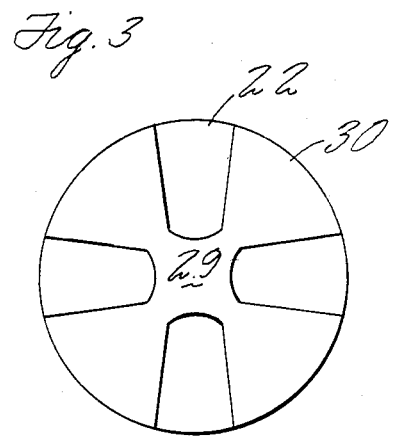
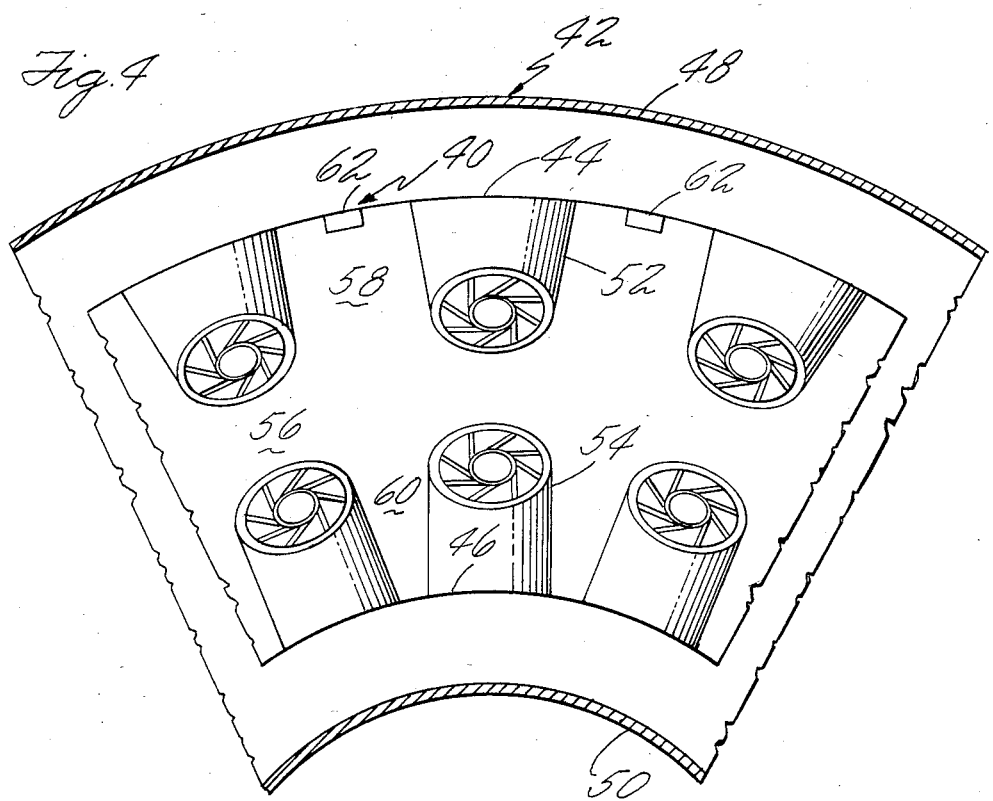

HIGH-PERFORMANCE BURNER CONSTRUCTION

TECHNICAL FIELD

This invention relates to a burner construction by which to reduce objectionable emissions in high-performance gas turbine engines such as jet engines for aircraft and more particularly to two-stage burners.

BACKGROUND ART

One form of high-performance burner is described in Markowski Ser. No. 397,395 and other improvements are described in the co-pending application of Lohmann et al, Ser. No. 968,652 having a common assignee with this application. In these constructions, the burner structure has axially spaced primary and secondary combustion zones which are structurally divided by a throat in the burner the purpose of which is to improve combustion in the secondary zone. Primary fuel is injected preferably in a wide spray to mix with and burn completely in the primary zone and secondary fuel is discharged in such a manner that it enters the throat before any significant secondary combustion occurs. Air and fuel mixing in the secondary zone is improved by short air swirler inlets generally in the form of pipes or tubes extending into the secondary zone and having swirlers therein to deliver a swirl of air into the secondary zone at a point spaced from the wall of the burner.

Although these air swirlers accomplish mixing to a great extent, adequate mixing requires several of these swirlers if the required low emissions are to be achieved. The throat also interferes with the desired flow pattern in the primary combustion zone and may affect the emissions at low power when the power plant is operating only on primary fuel. CO, $NO_x$ and unburned hydrocarbons are all serious problems at low power.

DISCLOSURE OF INVENTION

One feature of this invention is the use of a plurality of air swirlers in such an arrangement as to create the effect of the throat without the need for an actual throat structure within the burner can. Another feature is the location and dimension of these swirlers within the burner so that adequate mixing results and the momentum of the jets of air is used to accelerate the mixing.

Another feature is the use of the blockage established by these tubes to provide flow acceleration otherwise provided by the throat at the end of the primary zone. The effect is that radial displacement of the gas streams in the burner is significantly reduced with respect to the utilization of the throat and at the same time obtaining the desired axial acceleration of the gases.

Another feature is the use of these plunged swirlers to improve the mixing of the secondary fuel with the gases in the burner as the flow enters the secondary combustion zone.

According to the invention, the downstream end of the primary zone is created by several air swirler tubes extending radially inward into the burner to create a small circular central unimpeded flow area and a multi-lobed area extending outwardly therefrom between the tubes. These tubes are positioned at an acute angle to the axis of the burner so that the air enters the burner with a significant axial velocity downstream that improves mixing with the combustion gases flowing through the lobes. These tubes create the effect of a burner throat with significantly less flow interference. Mixing of the secondary fuel with the gases in the burner may alternatively be obtained by a discharge of the secondary fuel through nozzles located between the air swirler tubes and upstream of the discharge ends of the tubes.

The foregoing, and other objects, features and advantages of the present invention will become more apparent in the light of the following detailed description of the preferred embodiment thereof as shown in the accompanying drawing.

BRIEF DESCRIPTION OF THE DRAWINGS

FIG. 2 is a sectional view along the line 2—2 of FIG. 1.

FIG. 3 is a schematic showing the multi-lobed flow area created by the plunged tubes.

FIG. 4 is a transverse sectional view similar to FIG. 2 showing a modification.

BEST MODE FOR CARRYING OUT THE INVENTION

Figure 1:
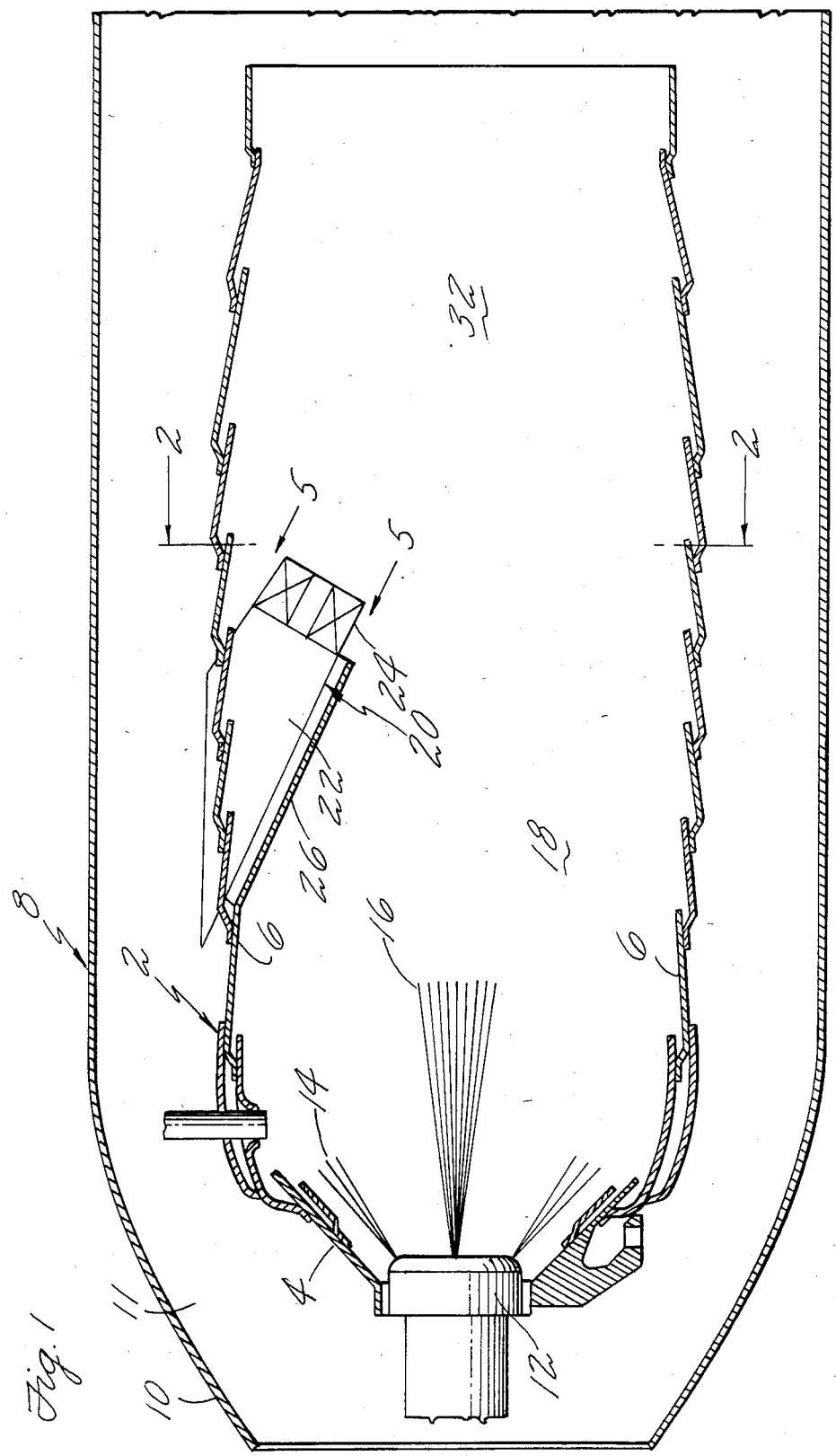
FIG. 1 is an axial sectional view substantially along the line 1—1 of FIG. 2 through a burner incorporating the invention.

The invention is shown in a burner can having an end cap 4 and generally cylindrical sidewalls 6 extending downstream from the edges of the cap. The burner is positioned within a combustion chamber duct 8 having an inlet end 10 receiving air under pressure as from a compressor and the inlet diverges to form a diffuser 11 to increase the pressure of the air as it approaches and flows around the end cap. In FIG. 1, the invention as shown, is applied to a can-type of burner.

Fuel is introduced to the burner can through the nozzle 12 located centrally of the cap, and in this arrangement, the primary or pilot fuel is discharged in a conical wide-angle spray 14 and the secondary fuel is discharged in an axially directed small angle spray 16 concentric with and located within the primary spray cone. The primary zone 18 for combustion is the area directly downstream of the cap. Tubular air swirlers 20 are positioned in the sidewalls of the burner and extend radially inward at an acute angle to the axis of the burner. Each swirler is in the form of a tube 22 secured in the sidewall of the burner and open to the space surrounding the burner to receive air therefrom. A swirler 24 in the inner end of the tube imparts a swirl to the air entering the burner and causes mixing of this entering air with the products of combustion flowing past these tubes. To protect the leading surface of the tube from the heat from the combustion in primary zone, a "T" type cooling louver 26 may be mounted on the tube. This louver is connected to and supported on the sidewall of the burner by posts 27 and air enters the space between the tube and the louver through small air holes 28 in the tube that conducts air from within the tube into the space between the louver and the tube. The discharge end of these tubes is spaced from the end cap an amount equal to about one to one and one half times the transverse dimension of the burner can.

As shown in FIG. 2, these several tubular swirlers are arranged uniformly around the periphery of the burner and are in the same area axially of the burner. The secondary fuel spray 16 is at such an angle as to substantially fill the clear central passage in the burner defined by the inner ends of these tubes. As shown in FIG. 3, this clear space 29 communicates with lobes 30 located between the adjacent tubular swirlers for additional area for flow of the products of combustion from the primary zone located upstream of these swirlers into the secondary combustion zone 32 downstream of the swirlers. The effect of these tubular swirlers is to establish a dividing line between the primary and secondary combustion zones.

The effect of these several tubular swirlers is also to create effectively a throat between the primary and secondary zones. However, this throat area, instead of being circular, is a multi-lobed area with the lobes extending to the burner sidewalls so that the flow from the primary zone is not forced into a central circular throat area, but is accelerated through the lobes with very little radial displacement of the streamlines of the flow in those areas between the swirler tubes.

This undistorted flow leads to less interference with the recirculating flow pattern in the primary zone that is critical to minimizing the emissions at low power. The tubular swirlers, extending as they do directly into the gas stream, provide improved mixing of the air entering through the tubes with the secondary fuel and the gases entering the secondary zone past the swirlers. Further, with the discharge from the tubular swirlers located within the gas stream through the burner and directed with an axial component in a downward direction, the momentum of the jets of air from these swirlers is used in accelerated mixing without significantly reducing the rate of flow in the burner. In this way, the desired recirculation may occur in the primary zone for minimum emissions at low power and a thorough mixing of the combustion air from the swirlers with the secondary fuel and gases passing the swirlers, results in a minimum of emissions at high power. It will be noted that the angle of the secondary fuel discharge is such as to fill the central open space at the ends of the swirlers.

Figure 6:
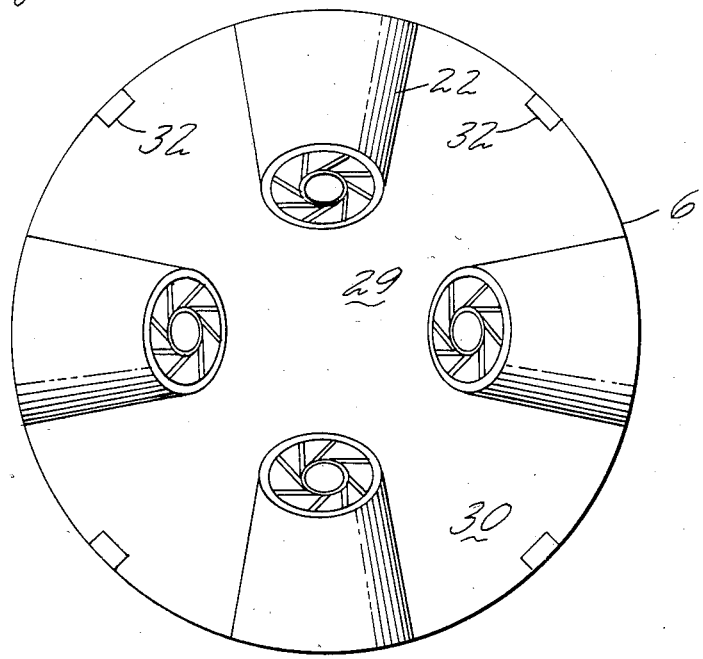
FIG. 6 is a view similar to FIG. 2 of a modification.
Figure 5:
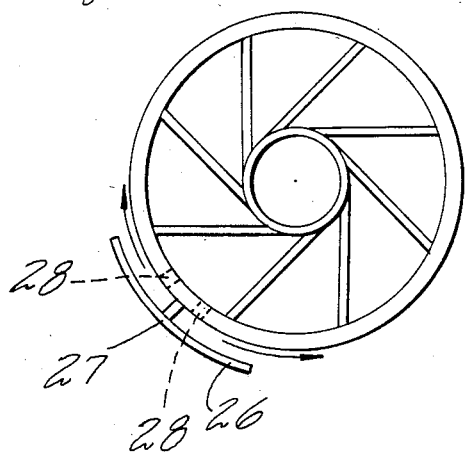
FIG. 5 is an end view of a detail of the swirler tube.

As shown in FIG. 6, instead of injection centrally of the cap, the secondary fuel may be injected through pressure-atomized nozzles 32 in the sidewall of the burner just upstream of the swirlers and offset circumferentially from the swirlers so that the secondary fuel enters the secondary zone essentially through the lobes with which these fueling nozzles are axially aligned.

The invention is equally applicable to an annular burner construction. As shown in FIG. 4, the annular burner 40 is located in an annular case 42, the walls 44 and 46 of the burner being spaced from the walls 48 and 50 of the case. The plunged tubular swirlers 52 extend radially inward from the outer wall 44 and similar swirlers 54 extend radially outward from the inner walls 46. These swirlers 52 and 54 are positioned in radial opposition to one another as shown.

The adjacent ends of the swirlers are radially spaced from one another to leave a clear, unobstructed, annular space 56 comparable to a throat and the spaces between adjacent swirlers on either wall form lobes 58 & 60 for unobstructed flow from primary to secondary combustion zones. In this arrangement, it is preferable to use the form of secondary fuel injection shown In FIG. 6 with the secondary nozzle 62 aligned with the spaces between the tubular swirlers as shown. In other respects, the function and operation of the annular burner with these swirlers is the same as above described with respect to FIGS. 1-3.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A burner construction for a gas turbine including:
an end cap having a primary injection nozzle therein;
sidewalls extending downstream from the periphery of the cap;
a row of tubes extending substantially radially inwardly from the sidewalls to a point adjacent the axis of the burner and positioned at an acute angle to the longitudinal axis of the burner, the inner ends of the tubes being spaced from one another to define a clear axial passage centrally of the burner, the tubes being circumferentially spaced from each other to leave an axial passage therebetween, the spacing of adjacent tubes creating lobes for air passage extending outwardly from the axial passage; and
a curved shield on the upstream sides of the tubes and spaced therefrom, said shield defining a space at the edge adjacent the sidewall for the admission of cooling air to the space between the shield and the tube.

2. A burner construction including:
an annular combustion chamber;
an annular burner within said chamber having;
an annular end cap with a plurality of primary fuel nozzles located therein;
annular sidewalls extending downstream from opposite edges of the annular cap;
a row of tubes extending inwardly from each sidewall toward the center of the burner, said tubes having swirlers at their inner ends, said tubes being circumferentially spaced and the inner ends being spaced from each other to define a centrally located open passage, with outwardly extending lobes between the sidewalls; and
a curved shield on the upsteam sides of the tubes and spaced therefrom, said shield defining a space at the edge adjacent the sidewall for the admission of cooling air to the space between the shield and the tube.

* * * * *